July 15, 1969    R. B. BARNES ET AL    3,456,111
THERMOGRAPH SYSTEM FOR PRODUCING THERMOGRAMS HAVING
IDENTIFICATION CHARACTERS SIMULTANEOUSLY
RECORDED THEREON
Filed July 21, 1967
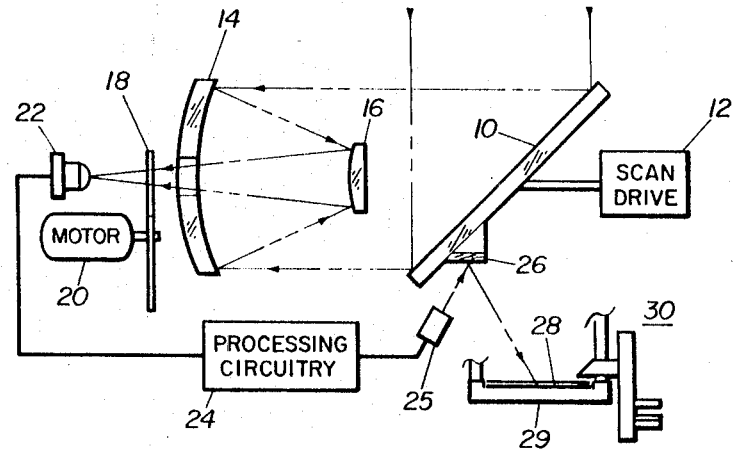
Fig_1
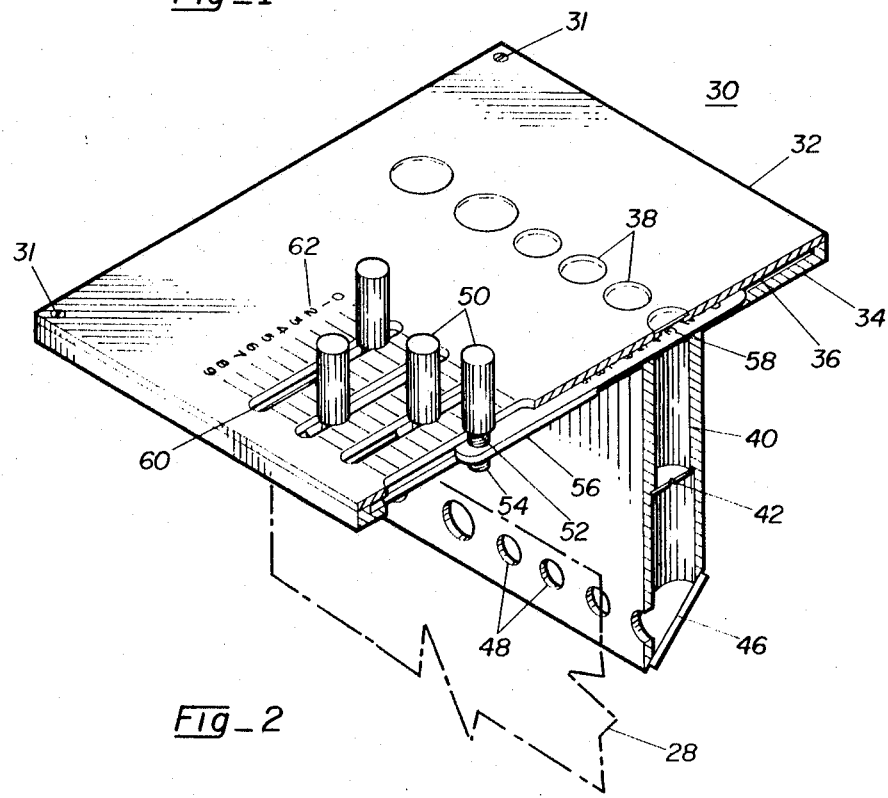
Fig_2
INVENTOR.
ROBERT BOWLING BARNES
HERMAN PAASO JR.
BY Joseph Levinson

United States Patent Office 3,456,111
Patented July 15, 1969

3,456,111
THERMOGRAPH SYSTEM FOR PRODUCING THERMOGRAMS HAVING IDENTIFICATION CHARACTERS SIMULTANEOUSLY RECORDED THEREON
Robert Bowling Barnes and Herman Paaso, Jr., Stamford, Conn., assignors to Barnes Engineering Company, Stamford, Conn., a corporation of Delaware
Filed July 21, 1967, Ser. No. 655,102
Int. Cl. G01j 3/04
U.S. Cl. 250—67                                    3 Claims

ABSTRACT OF THE DISCLOSURE

A thermograph system is provided for collecting and converting infrared radiation from the field of view into electrical signals which are translated into a visual presentation in the form of thermograms. Simultaneously with the recording of the signals on film, the film is exposed by an identification means which has a plurality of light-passing channels with characters positioned in the channels and exposed on film through a pinhole in each channel. Means are provided for positioning and changing the characters in the channels for readily identifying a single or series of thermograms made by the thermograph.

Background of the invention

In Patent No. 2,895,049, entitled, "Image Transducer," by R. W. Astheimer et al., an infrared camera, referred to herein as a thermograph, is provided which is sensitive to long-wave infrared radiation and produces a thermal image of a scanned field of view. The thermal image is recorded on film, and is referred to as a thermogram, in which the grayness of the picture is a prescribed function of the infrared radiance of objects in the scanned field of view of the thermograph. In the aforesaid patent, a field of view is scanned and the radiation therefrom collected and applied to an infrared detector which produces electrical signals which are processed and applied to a glow modulator tube which is scanned over film synchronously with the scanning of the field of view to provide the thermogram. In another form the signals generated by the infrared detector may be applied to an oscilloscope and a permanent record thereof may be provided by photographing the face of the oscilloscope. The thermograms are made using conventional photographic film. Thermographs are now being extensively employed for medical applications, in the field of nondestructive testing, and many others in which a large number of thermograms are made. One of the problems encountered has been in the proper identification of the thermograms to readily identify the subject or subject-matter being thermographed, whether a single or series of thermograms has been made. Currently, in medical applications the operator of the thermograph merely puts identifying characters on the back of the thermograph after the picture is developed. This is a time-consuming and sometimes difficult job in view of the fact that the film, when developed, is wet and requires a chemical fix which must be applied and allowed to dry before any marks can be made. In other words, physical handling of the film is difficult, which makes the application of identifying characters time-consuming, difficult, and possibly injurious to the thermogram.

It is accordingly an object of the present invention to provide a thermograph system having a means of providing thermogram identification which is simple, economical, does not burden the operator with time-consuming or difficult tasks, and requires no handling of the thermograms in providing suitable identification.

Summary of the invention

A thermograph system is provided with an identification means for recording characters on thermograms simultaneously with the making of the thermograms. The identification means includes a plurality of light-passing channels, each having an upper opening in which characters are positioned, a pinhole opening, and a lower opening in optical alignment, with the lower opening positioned to pass light normal to the surface of the film on which the thermogram is made. Means are provided for positioning a plurality of characters in the upper openings of the channel, which expose the film to the characters at the same time that the thermogram is exposed for information from the field of view of the thermograph.

Brief description of the drawings

FIG. 1 is a schematic diagram illustrative of one form of thermograph system employing the present invention, and FIG. 2 is an enlarged isometric view of an identification means which is employed in the thermograph system of this invention.

Description of the preferred embodiment

Referring now to FIG. 1, a thermograph is shown in which a plane front surface mirror 10 driven by a scan drive 12 scans the field of view of the thermograph. Radiation from the field of view is applied from the mirror 10 through a Cassegrain optical system including a primary optic 14 and a secondary optic 16 to an infrared detector 22. Interposed in the path of the radiation being applied to the detector 22 is a radiation chopper 18 which is driven by a motor 20. The radiation chopper 18 includes alternate transparent and opaque sections to the radiation from the field of view such that the detector alternately sees the radiation from the field of view and then the opaque section of the chopper blade. Accordingly, the amplitude of the signals produced by the detector 22 depends on the difference in the temperature of the radiation from the field of view and the temperature of the chopper blade, which acts as a radiation reference. Signals from the detectors 22 are applied to processing circuitry 24 which includes drive circuitry for a glow modulator tube 25. The intensity of the glow modulator 25 is modulated by the signals from the detector 22 and applied via a mirror 26 to film 28 on a camera back 29. Since the mirror 26 is mounted on the mirror 10, it is driven synchronously with the mirror 10, and as the mirror 10 scans the field of view of the camera, the glow modulator tube synchronously scans the film 28 to provide a visual presentation on film, referred to as a thermogram, which is a heat picture of the field of view of the camera. An identification means 30 is positioned on the camera back 29. The thermograph, schematically shown on FIG. 1, is the preferred form of the present invention. However, the invention is also applicable to other types of thermographs; for example, the signals from the detector may be processed and applied directly to an oscilloscope on which a camera is mounted, to instantly photograph the face of the oscilloscope to provide a thermogram.

The identification means 30 has an upper plate 32 and a lower plate 34 which is recessed at 36, with the upper and lower plates being attached by screws 31. The identification means 30 includes a plurality of channels 40 having upper openings therein extending through the upper and lower plates 32 and 34, and lower openings 48. Each channel 40 is enclosed near its lower end by a 45° front surface mirror 46. Intermediate each channel 40 is a pinhole opening 42 which is positioned midway between the openings 38 and 48. The upper openings 38 are covered by a clouded plastic material to diffuse incoming light. The upper plate 32 includes a plurality of channels 60 which have a plurality of thumbscrews 50 which are slidably mounted therein. The thumbscrews 50 have a lower flange 52 and a threaded end 54. The threaded end 54 of the thumbscrew 50 engages a character arm 56 which has a plurality of characters 58 punched therein which may, as shown, be numerical, or could be alphabetical. The thumbscrew 50 may be loosened in the channel 60, making the thumbscrew slidably movable in the channel 60, with the character arm 54 in the recessed portion 36 of the lower plate 34. When the desired character 58 is positioned under the opening 38, the thumbscrew is screwed down with the flange 52 bearing on the upper portions of the channel 60 of the upper plate 32, so that the arm 56 is firmly engaged with the character 58 in position. Different characters in the different channels may be accordingly moved readily from one position to another, making character change an easy operation. The openings 48 are positioned over the film 28 such that light passing through the openings 38 and the characters 58 and the pinhole 42, and reflected by the mirror 46 onto the surface of the film, expose the film to the light coming in almost normal to the surface of the film 28. The upper plate 32 is provided with a scale 62 which readily identifies the characters which are positioned in the openings 38.

The identification means 30 is mounted on the camera back 29 through a slot cut therein to accommodate the area of the channel structure, which puts it in a position which will not interfere with the information which is recorded on the film 38 from the field of view of the the camera. Accordingly, since a portion of the film is used which is not otherwise used, the exposure of the film to character identification does not interfere with the visual presentation of the field of view on the film 28. The identification means 30 as used in the present invention exposes the film to the proper identifying characters at the same time the film is being exposed to the field of view which is being thermographed. It has been found that the exposure between 15 seconds and 15 minutes will provide on the one hand enough exposure to give identification and not too much exposure so as to blur identification. It will be apparent that the length of the available exposure time does not make the identification a critical matter. Although it is preferable to keep the identification means 30 in the simple form shown, it will be apparent that shuttering could be provided to stop the exposure when the camera is finished scanning the field of view, or, more simply, merely a piece of tape may be applied over the holes to prevent light from exposing the film to the camera. When the identification means is not used, the slot in which it is mounted is covered by a suitable plate. The system is not subject to blurring or running between characters no matter how many channels are utilized, allowing great flexibility in the number and type of characters which may be recorded. It is not necessary that all of the channels provide adjustable characters. For example, a couple of the channels could have permanent characters of the type which, for example, would identify a specific hospital or a doctor or technician making the thermograms which are to be identified. Also, if a facility has more than one thermograph, it would be desirable to identify on the thermograms which camera was being employed.

Although it has been stated that the exposure time is not critical, if desired a constant source of illumination other than the light already available where the thermogram is being made may be made by encasing a light source over the openings 38, and the power therefor could be provided by the power supply of the thermograph. Again, this source could be turned on and off in accordance with the scanning of the field of view of the thermograph. Also, an electro-luminescent source could be provided in the openings 38 if desired. However, the very simple structure shown, using ambient light, would appear to be adequate in most cases, and is the simplest and most economical.

In utilizing the thermograph system of this invention, a very flexible and simple system is provided for identifying thermograms made by a thermograph. The system alleviates the problem of physically marking thermograms, and this is particularly useful, for example, in medical applications, where hundreds of thermograms may be made of many different patients. The threat of ruining the thermograms, which are wet and must be fixed after being taken, is eliminated, as well as the operating time which requires the operator to allow the film to dry before identifying marks can be made. The only operating requirement is the movement of a few thum screws, which is not considered to be a difficult nor a time consuming task even for unskilled operators.

We claim:
1. A thermograph system for collecting and converting infrared radiation from a field of view into electrical signals which are translated into a visual presentation in the form of a thermogram and simultaneous identification is provided on the thermogram for readily identifying a single or series of thermograms, comprising, in combination:
  (a) a thermograph for providing heat pictures on film in the form of thermograms,
  (b) identification means for recording characters on said thermograms in an area, which, is not exposed by the field of view of the thermograph, simultaneously with the making of said thermograms,
  (c) said identification means comprising a plurality of light passing channels each having an upper opening, a pin-hole opening and a lower opening therein, said upper and pin-hole openings being optically positioned with said lower opening to pass light normal to the surface of film on which the thermograms are recorded, and
  (d) means for positioning and changing characters in the upper openings of said channels for exposing the film in the shape of said characters.

2. The thermograph system set forth in claim 1 wherein said means for positioning characters in the upper openings includes a plurality of different characters which can be moved into said openings.

3. The thermograph system set forth in claim 1 wherein each of said plurality of channels includes a 45° mirror positioned near said lower openings for reflecting light out said lower openings from said upper opening and said pin-hole opening.

References Cited

UNITED STATES PATENTS 2,858,446 10/1958 Parish _____ 250—67
2,975,282  3/1961 Schaffer _____ 250—65

ARCHIE R. BORCHELT, Primary Examiner

A. L. BIRCH, Assistant Examiner

U.S. Cl. X.R.

95—1.1; 250—65